US012365058B2

(12) United States Patent
Weingärtner

(10) Patent No.: US 12,365,058 B2
(45) Date of Patent: Jul. 22, 2025

(54) STEADY REST FOR SUPPORTING A WORKPIECE BEING MACHINED

(71) Applicant: AFW HOLDING GMBH, Kirchham (AT)

(72) Inventor: Dominik Weingärtner, Pettenbach (AT)

(73) Assignee: AFW HOLDING GMBH, Kirchham (AT)

( * ) Notice: Subject to any disclaimer, the term of this patent is extended or adjusted under 35 U.S.C. 154(b) by 1350 days.

(21) Appl. No.: 16/646,726

(22) PCT Filed: Sep. 4, 2018

(86) PCT No.: PCT/EP2018/073733
§ 371 (c)(1),
(2) Date: Jun. 26, 2020

(87) PCT Pub. No.: WO2019/052856
PCT Pub. Date: Mar. 21, 2019

(65) Prior Publication Data
US 2021/0031316 A1    Feb. 4, 2021

(30) Foreign Application Priority Data
Sep. 15, 2017  (EP) ..................... 17191292

(51) Int. Cl.
*B23Q 1/76*    (2006.01)
*B23Q 1/58*    (2006.01)
*B24B 41/06*   (2012.01)

(52) U.S. Cl.
CPC ............... *B23Q 1/763* (2013.01); *B23Q 1/58* (2013.01); *B23Q 1/76* (2013.01); *B24B 41/065* (2013.01); *B23Q 2240/007* (2013.01)

(58) Field of Classification Search
CPC ............ B23Q 1/40; B23Q 1/527; B23Q 1/76; B23Q 1/763; B23Q 1/766; B23Q 1/58;
(Continued)

(56) References Cited

U.S. PATENT DOCUMENTS 3,203,286 A   8/1965  Dombrowski
4,754,673 A * 7/1988  Hiestand .................. B23Q 1/76
                                                        82/162

(Continued)

FOREIGN PATENT DOCUMENTS

DE    1402955    10/1968
DE    2141701     3/1973
(Continued)

OTHER PUBLICATIONS

WO2019006811A1 English Translation (Year: 2019).*
(Continued)

*Primary Examiner* — Makena S Markman
(74) *Attorney, Agent, or Firm* — Greenblum & Bernstein. P.L.C.

(57) ABSTRACT

A steady rest for supporting a, particularly elongate, workpiece undergoing mechanical work and particularly machining, having: a steady rest main part that can be arranged in a device for machining a workpiece being machined, and at least one support arrangement which is disposed or designed on said steady rest main part and configured to support a workpiece being machined, and comprises at least one support element that supports a workpiece requiring support, wherein said at least one support arrangement is disposed or designed to be mounted on the steady rest main part such that it can move, relative to said steady rest main part, in at least one degree of freedom of movement which defines a path of movement.

11 Claims, 6 Drawing Sheets

(58) Field of Classification Search
CPC .......... B23Q 3/06; B23Q 3/062; B23Q 3/064;
B23Q 2240/007; B23B 13/126; B23K
37/0538; Y10T 82/2593; Y10T 82/2597;
Y10S 294/902; B25B 1/103; B25B 1/02;
B25B 1/20; B24B 41/065; B24B 5/22;
B24B 5/225; B24B 5/02; B24B 5/04;
B24B 5/045; B24B 5/047; B24B 19/04;
B24B 19/06
See application file for complete search history.

(56) References Cited

U.S. PATENT DOCUMENTS

| | | | | |
|---|---|---|---|---|
| 5,481,951 | A * | 1/1996 | Kiefer | B23Q 1/76 82/162 |
| 5,860,341 | A * | 1/1999 | Visigalli | B23Q 1/76 82/170 |
| 6,458,022 | B1 * | 10/2002 | Folz | B24B 41/067 451/379 |
| 6,901,831 | B2 * | 6/2005 | Siegwart | B23Q 1/76 82/162 |
| 9,144,868 | B2 * | 9/2015 | Huang | B23Q 1/00 |
| 9,174,317 | B1 * | 11/2015 | Lessway | B23Q 3/06 |
| 9,533,355 | B2 * | 1/2017 | Esser | B23B 25/06 |
| 10,357,858 | B2 * | 7/2019 | Nuber | B23Q 1/76 |
| 2002/0029668 | A1 * | 3/2002 | Kroisandt | B23Q 1/0036 82/53 |
| 2018/0169811 | A1 * | 6/2018 | Meng | B23Q 1/25 |

FOREIGN PATENT DOCUMENTS

| | | | |
|---|---|---|---|
| DE | 2542959 | 3/1977 | |
| JP | S5272992 | 6/1977 | |
| WO | WO-2019006811 A1 * | 1/2019 | ............... B23Q 1/76 |

OTHER PUBLICATIONS

International Search Report in International Patent Application No. PCT/EP2018/073733, dated Feb. 19, 2019.
Written Opinion in International Patent Application No. PCT/EP2018/073733, dated Feb. 19, 2019.

* cited by examiner

STEADY REST FOR SUPPORTING A WORKPIECE BEING MACHINED

The invention relates to a steady rest for supporting an in particular elongate workpiece that is to be mechanically processed, in particular machined, comprising a steady rest main body that can be arranged in a device for mechanical machining of a workpiece that is to be mechanically machined, and at least one support means that is arranged or formed on the steady rest main body and is intended for supporting a workpiece that is to be mechanically machined, which support means comprises at least one support element that supports a workpiece to be supported.

Corresponding steady rests for supporting in particular elongate workpieces, i.e. for example shafts, that are to be mechanically processed, in particular machined, are known per se from the field of mechanical workpiece machining, i.e. in particular from the field of turning and milling.

Typically, corresponding steady rests comprise a steady rest main body having a plurality of support means, i.e. for example clamping or gripping jaw means, that are arranged on said steady rest main body and each comprise at least one support element, i.e. for example a clamping or gripping jaw.

Each of the support means are typically arranged in a fixed or stationary manner on the steady rest main body; in other words, the arrangement of the respective support means relative to the steady rest main body typically cannot be changed. Consequently, only workpieces of specific, in particular cross-sectional, dimensions can be supported using a steady rest.

This is a situation that requires improvement, in particular in view of the desirable possibility of simple, flexible support of workpieces of (significantly) different dimensions, in particular with respect to the cross section, that are to be supported by the steady rest.

The object of the invention is that of specifying a steady rest for supporting a workpiece that is to be mechanically machined, which steady rest is improved in particular in view of the possibility of simple, flexible support of workpieces of (significantly) different dimensions, in particular with respect to the cross section, that are to be supported by the steady rest.

The object is achieved by a steady rest according to claim 1. The claims dependent thereon relate to possible embodiments of the steady rest according to claim 1.

The steady rest described herein is generally used for supporting or mounting an in particular elongate workpiece that is to be mechanically processed, i.e. in particular machined. The workpiece can be a shaft for example.

The steady rest comprises a steady rest main body that can be arranged in a device for mechanical processing, in particular machining, of a workpiece that is to be mechanically machined. The steady rest main body is therefore the component of the steady rest by means of which said rest can be arranged in a device for mechanical machining of a workpiece that is to be mechanically machined, i.e. for example a turning or milling center. For this purpose, the steady rest main body is received in a receiving region provided therefor, typically a machine bed, of a corresponding device. The steady rest main body can be received in a receiving region, provided therefor, in a corresponding device, either directly or indirectly, by means of interposition of a steady rest support.

Reception of the steady rest main body in the receiving region, provided therefor, on the device side, can involve cooperation of suitable, in particular mechanical, interfaces on the side of the steady rest main body or steady rest support, and on the side of the receiving region. Receiving the steady rest main body in the device-side receiving region provided therefor can furthermore involve movable mounting of the steady rest main body or the steady rest (optionally together with the steady rest support, in each case) relative to the device. As a result, the steady rest main body or the steady rest (optionally together with the steady rest support, in each case) can optionally be moved along a defined, typically linear, movement path, relative to the device.

At least one support means that is designed for supporting or mounting a workpiece to be mechanically machined, is arranged or formed on the steady rest main body. The support means comprises at least one support element that supports a workpiece to be supported. Typically, at least two support means that are designed for supporting or mounting a workpiece to be mechanically machined, are arranged or formed on the steady rest main body, each support means comprising at least one support element that supports a workpiece to be supported. Each support means can comprise a main body on which at least one corresponding support element is arranged or formed. A support means can be a clamping or gripping means, i.e. for example a clamping or gripping jaw means, and a corresponding support element can accordingly be a clamping or gripping element, i.e. for example a clamping or gripping jaw.

The at least one support means or at least one support means is arranged or formed on the steady rest main body so as to be movable, relative to the steady rest main body, in at least one degree of freedom of movement that defines a movement path. In contrast to the known steady rests described at the outset which have a fixed or stationary arrangement of the respective support means on a steady rest main body, the steady rest described herein is therefore characterized by a moveably mounted arrangement or formation of at least one support means on the steady rest main body. Typically, all the support means of the steady rest are arranged or formed so as to be movable, relative to the steady rest main body, in at least one degree of freedom of movement that defines a movement path.

Each support means that is accordingly arranged or formed on the steady rest main body so as to be movable relative to the steady rest main body is typically mounted so as to be movable between at least two defined positions; the movement path along which the support means is movably mounted thus extends at least between the two defined positions. As can be seen in the following, a first position may be an operating position of the relevant support means, in which support of a workpiece to be supported is possible using the support means, and a non-operating position in which support of a workpiece to be supported is not possible, using the support means.

The arrangement or formation of the at least one support means on the steady rest main body in a manner mounted so as to be movable relative to the support means, provides an option for simple, flexible support of workpieces of (significantly) different dimensions, in particular with respect to the cross section, that are to be supported by the steady rest. Therefore, an improved steady rest for supporting a workpiece to be mechanically machined is provided.

The at least one degree of freedom of movement is typically a translational, in particular linear, degree of freedom of movement. The movement path defined by the at least one degree of freedom of movement is therefore typically a translational, in particular linear, movement path. Of course, other degrees of freedom of movement are in principle possible, i.e. in particular also combined degrees of freedom of movement made up of different degrees of freedom of movement, as well as other movement paths, accordingly.

As mentioned, the steady rest can comprise two support means that each comprise at least one support element that supports a workpiece to be supported. The two support means are in each case arranged or formed so as to be movable, in a manner depending on or independently of one another, relative to the steady rest main body, in at least one degree of freedom of movement that defines a movement path. In the case of dependent movable mounting of the support means, a change in the position of a first support means, caused by a movement of the first support means, is (necessarily) associated with a movement of a second support means, and thus a change in the position of a second support means. In this case, the movements of the support means are typically not oriented in the same direction i.e. the support means are moved towards one another or away from one another. Accordingly, in the case of independent mounting of the support means, a change in the position of a first support means, caused by a movement of the first support means, is not (necessarily) associated with a movement of a second support means, and thus a change in the position of a second support means.

Independently of an embodiment comprising one or more movably mounted support means, the steady rest main body can comprise two, in particular ramp-like, guide portions that are oriented so as to be at an angle relative to one another. The guide portions are typically arranged or formed so as to be opposite one another (in a front view of the steady rest). The guide portions can be arranged so as to be V-like or V-shaped, the guide portions forming the limbs of the V. As a result, the guide portions extend in a straight line (having a constant gradient with respect to an e.g. horizontal reference plane) and can transition, in the region of the respective ends thereof, into a ridge (cutting edge) formed by the respective ends thereof. The angle between the surfaces or upper faces of the guide portions that are exposed at least in portions is therefore typically greater than 180°, resulting in the angled orientation or a course of the relevant guide portions that is inclined with respect to a, for example horizontal, reference axis. Of course, it is in principle also possible for the guide portions to extend not in a straight line, but rather e.g. in a (convexly or concavely) curved manner at least in portions.

If the steady rest main body comprises corresponding guide portions, each of the support means is typically arranged or formed on a guide portion so as to be movable, relative to a relevant guide portion, in the at least one degree of freedom of movement. A first movably mounted support means is mounted so as to be movable relative to a first guide portion, i.e. associated with a first guide portion, and a second movably mounted support means is mounted so as to be movable relative to a second guide portion, i.e. is associated with a second guide portion. Each of the support means is typically positioned directly on respective guide portions.

Each guide portion can be elongate and thus have a longitudinal axis. A support means associated therewith can accordingly be arranged or formed on said guide portion in a manner so as to be movable relative thereto, in a movement path that extends along the longitudinal axis of the guide portion, in particular in parallel therewith. The longitudinal axis of each guide portion can therefore similarly define the movement path, a relevant support means being arranged or formed so as to be movable along said movement path, relative to the guide portion, allowing for a defined movement of each support means relative to a respective guide portion.

As is clear from the following, a corresponding guide portion can form a part of a guide means that is designed for guiding a movement of a support means in the at least one movement path that is defined by the at least one degree of freedom of movement.

In order to form a corresponding guide means, a corresponding guide portion on the steady rest main body side can cooperate with a guide element that is arranged or formed on the support means side. The guide means can thus comprise at least one first guide element that is arranged or formed on the steady rest main body side, in particular the guide portion side, and at least one second guide element which cooperates therewith and is arranged or formed on the support means side.

A first guide element arranged or formed on the steady rest main body side may for example be a guide surface or geometry that is for example T-shaped in cross section, and a second guide element arranged or formed on the support means side may for example be a mating guide surface or geometry that surrounds a corresponding guide surface or geometry, at least in portions. Of course, an inverted configuration of the first and second guide elements, respectively, is conceivable. Alternatively or in addition, a first guide element arranged or formed on the steady rest main body side may for example be a dovetail guide surface or geometry, and a second guide element arranged or formed on the support means side may for example be a mating guide surface or geometry that surrounds a corresponding guide element that can be or is received in the guide recess for example in a slide-like, drawer-like or roller-like manner, and therefore may for example be a guide element that is formed as a sliding or rolling element. Of course, an inverted configuration of the first and second guide elements, respectively, is conceivable here too.

In all the embodiments the guide means can equally ensure a captive arrangement of each support means on the steady rest main body. As a result the guide means can, in addition to the guide function, also exert a securing function of the respective support means on the steady rest main body.

As mentioned, each movably mounted support means can in particular be arranged or formed on the steady rest main body so as to be movable between an operating position in which support for a workpiece to be supported takes place/is possible, and a non-operating position in which support of a workpiece to be supported does not take place/is not possible. In the operating position, the support means is typically moved against the workpiece to be supported, in particular jammed or clamped against the workpiece to be supported, i.e. mechanical contact exists between the relevant support element of the support means and the workpiece that is to be supported or is being supported. The workpiece is thus supported by the support means in a secure manner, i.e. in particular in a fixed or stationary manner, and can be mechanically machined.

In the operating position of a relevant support means, optionally in the operating position of relevant correspondingly movably mounted support means, a possibility can be provided for a machining tool of a device for mechanical machining of a workpiece to be mechanically machined to pass through, such that, in particular along the longitudinal axis of a workpiece that is supported by the steady rest and is to be mechanically machined, a machining tool, i.e. for example a milling tool, can pass the steady rest due to the possibility for passage, in the direction of the longitudinal axis of the workpiece that is to be mechanically machined. The steady rest can therefore be designed in such a way that it does not prevent continuous mechanical machining of the workpiece supported thereby, since it is possible for a corresponding machining tool to pass through, beyond the steady rest, without interruption of a mechanical machining process.

As mentioned, the steady rest can comprise two support means that are in each case mounted so as to be movable, in a mutually dependent manner, in at least one degree of freedom of movement that defines a movement path. Therefore, synchronous or synchronized movements of the support means, e.g. from the relevant operating position into the relevant non-operating position, and vice versa, are in principle possible. Dependent movable mounting of the support means can be achieved for example by motion-coupling of the support means. If the steady rest comprises two support means that are mounted so as to be movable independently of one another, said means can thus be motion-coupled (to one another). Motion-coupling of the support means allows for synchronous or synchronized movements of the support means, e.g. from the relevant operating position into the relevant non-operating position, and vice versa.

Motion-coupling of the support means can also be achieved by a coupling means connected between the support means. The coupling means can be coupled to a first support means by a first coupling portion, and to a second support means by a second coupling portion. The coupling means comprises at least one coupling element. The coupling element can be coupled to a first support means by a first coupling element portion, and to a second support means by a second coupling element portion. The coupling means can be actuating cylinder means, and the coupling element can accordingly be an, in particular hydraulic, actuating cylinder. The coupling means or the coupling element can form a component of a drive means which is designed for generating a drive force that causes the at least one support means to move in the at least one degree of freedom of movement.

The steady rest can thus comprise at least one drive means which is designed for generating a drive force that causes the at least one, optionally both, of the support means to move in the at least one degree of freedom of movement. The drive means can be coupled directly or indirectly, i.e. with interposition of at least one force-transmitting assembly, i.e. for example a corresponding coupling means, to a relevant support means to be moved. Specifically, the drive means can act on the coupling means in order to cause the coupling element to extend or retract, which, owing to the coupling of the coupling element to the support means, leads to a movement of the support means relative to the steady rest main body. The direction of action of the drive force that can be or is generated by the drive means can correspond to the direction of movement of the relevant support means. The drive means can act for example electrically, hydraulically or mechanically, and therefore the drive means can be designed for example as an electrical and/or hydraulic and/or mechanical drive means or can comprise at least one such means.

The steady rest can comprise at least one chip protection means which is designed to prevent deposition of cut material, i.e. in particular chippings, resulting during the processing, in particular machining, of the workpiece from being deposited on functionally relevant portions of the steady rest. The chip protection means can comprise a plurality of in particular plate-like or plate-shaped chip protection elements which can be arranged or formed on different portions of the steady rest. At least one first chip protection element can for example be arranged or formed in the region of the guide portions in order to prevent deposition of cut material here, and at least one second chip protection element can for example be arranged or formed in the region of the support means, i.e. in particular on the portions of the support means that face in the machining direction, in order to prevent deposition of cut material here.

The steady rest can further comprise at least one scraper means, e.g. in the form of bristles or brushes, which is in particular arranged or formed on the support means side and is designed to allow for scraping or removal, from the guide portions, of cut material that may have been deposited on the guide portions, by means of a corresponding movement of the support means. The scraper means may be arranged or formed for example in the region of respective second guide elements that are arranged or formed on the support means side and which, as mentioned, may for example be a mating guide surface or geometry that overlaps or surrounds a corresponding guide surface or geometry, at least in portions.

In order to allow for temporary blocking of a (further) movement of a movably mounted support means, the steady rest may comprise at least one blocking means which is designed for blocking a movement of the at least one support means, in particular for blocking a support means, moved into an operating or non-operating position, in the operating or non-operating position. The blocking means can act for example magnetically and/or mechanically, and therefore the blocking means can comprise at least one for example magnetically and/or mechanically acting blocking element, i.e. for example a locking magnet or a locking pin.

In addition to the steady rest, the invention also relates to a device for mechanical processing, in particular machining, of an in particular elongate workpiece that is to be mechanically processed, in particular machined. The device can for example be a turning or milling center. The device is characterized in that it comprises at least one steady rest as described. All the statements made in connection with the steady rest therefore apply analogously to the device.

The invention will be explained in the following, with reference to an embodiment shown in the drawings. In the drawings.

FIGS. 1-4 are each schematic views of a steady rest 1 according to an embodiment. The steady rest 1 is shown in an operating position in FIGS. 1 and 2, FIG. 1 being a perspective view of the steady rest 1 and FIG. 2 being a front view of the steady rest 1, and in a non-operating position in FIGS. 3 and 4, FIG. 3 being a perspective view of the steady rest 1 and FIG. 4 being a front view of the steady rest 1.

Figure 1:
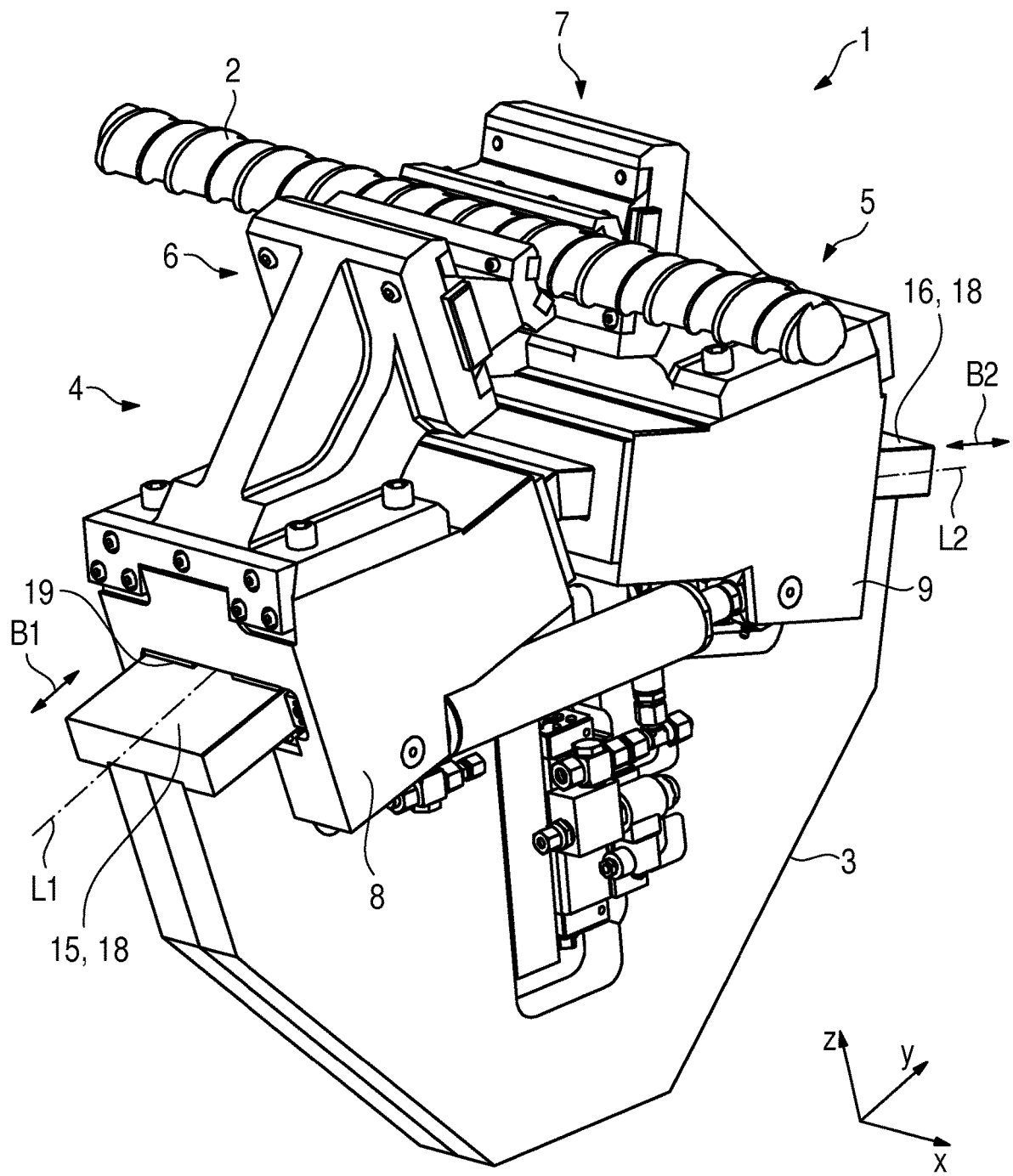
FIGS. 1 and 2 are each schematic views of a steady rest according to an embodiment, in an operating position.
Figure 2:
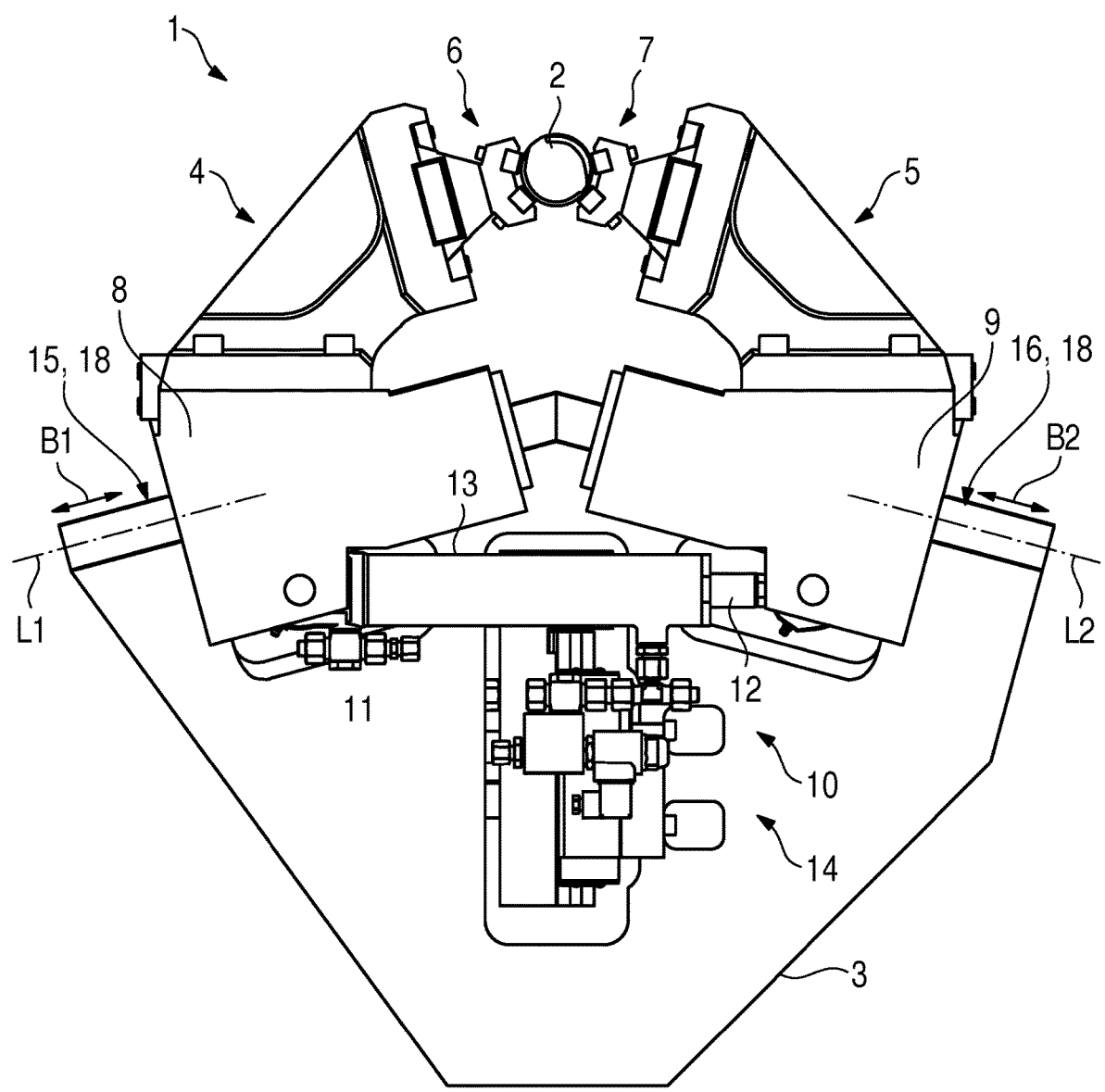

The steady rest 1 is used for supporting or mounting an in particular elongate workpiece 2 that is to be mechanically processed, i.e. in particular machined (cf. FIGS. 1 and 2). The workpiece 2 can be for example a shaft, as is shown for example in FIGS. 1 and 2.

The steady rest 1 comprises a steady rest main body 3 that can be arranged in a device (not shown) for mechanical processing, in particular machining, of a workpiece 2 that is to be mechanically machined. The steady rest main body 3 is therefore the component of the steady rest 1 by means of which said rest can be arranged in a device for mechanical machining of a workpiece 2 that is to be mechanically machined, i.e. for example a turning or milling center. For this purpose, the steady rest main body 3 is received in a receiving region provided therefor, typically a machine bed, of a corresponding device. The steady rest main body 3 can be received in a receiving region, provided therefor, in a corresponding device, either directly or indirectly, by means of interposition of a steady rest support (not shown).

Reception of the steady rest main body 3 in the receiving region, provided therefor, on the device side, can involve cooperation of suitable, in particular mechanical, interfaces on the side of the steady rest main body or steady rest support, and on the side of the receiving region. Receiving the steady rest main body 3 in the device-side receiving region provided therefor can furthermore involve movable mounting of the steady rest main body 3 or the steady rest 1 (optionally together with the steady rest support, in each case) relative to the device.

Two support means 4, 5 that are designed for supporting or mounting a workpiece 2 to be mechanically machined, are arranged or formed on the steady rest main body 3. The support means 4, 5 each comprise a support element 6, 7 of the workpiece 2 to be supported. It is clear that the support elements 6, 7 are arranged or formed on a main body 8, 9 of the support means 4, 5 that is arranged on the steady rest main body 3. In the embodiment shown in the figures, the support means 4, 5 are clamping or gripping means, i.e. for example clamping or gripping jaw means, and the support elements 6, 7 are accordingly clamping or gripping elements, i.e. for example clamping or gripping jaws. The support means 4, 5 are arranged or formed on the steady rest main body 3 so as to be movable, i.e. in the embodiment shown in the figures, displaceable, relative to the steady rest main body 3, in at least one degree of freedom of movement that defines a movement path B1, B2. The left-hand support means 4 in the figures is mounted so as to be movable along the movement path indicated by the double arrow B1, and the right-hand support means 5 in the figures is mounted so as to be movable along the movement path indicated by the double arrow B2.

The steady rest 1 is therefore characterized by a movably mounted arrangement or formation of the support means 4, 5 thereof on the steady rest main body 3. Even if, in the embodiment shown in the figures, both support means 4, 5 are arranged on the steady rest main body 3 so as to be movable relative to the steady rest main body 3, it is in principle also conceivable for only one support means 4, 5 to be arranged or formed on the steady rest main body 3 so as to be movable relative to the steady rest main body 3.

In the embodiment shown in the figures, the degree of freedom of movement is in each case a translational, in particular linear, degree of freedom of movement. Therefore, in the embodiment shown in the figures, the movement path B1, B2 defined by the relevant degree of freedom of movement in each case is a translational, in particular linear, movement path.

Figure 3:
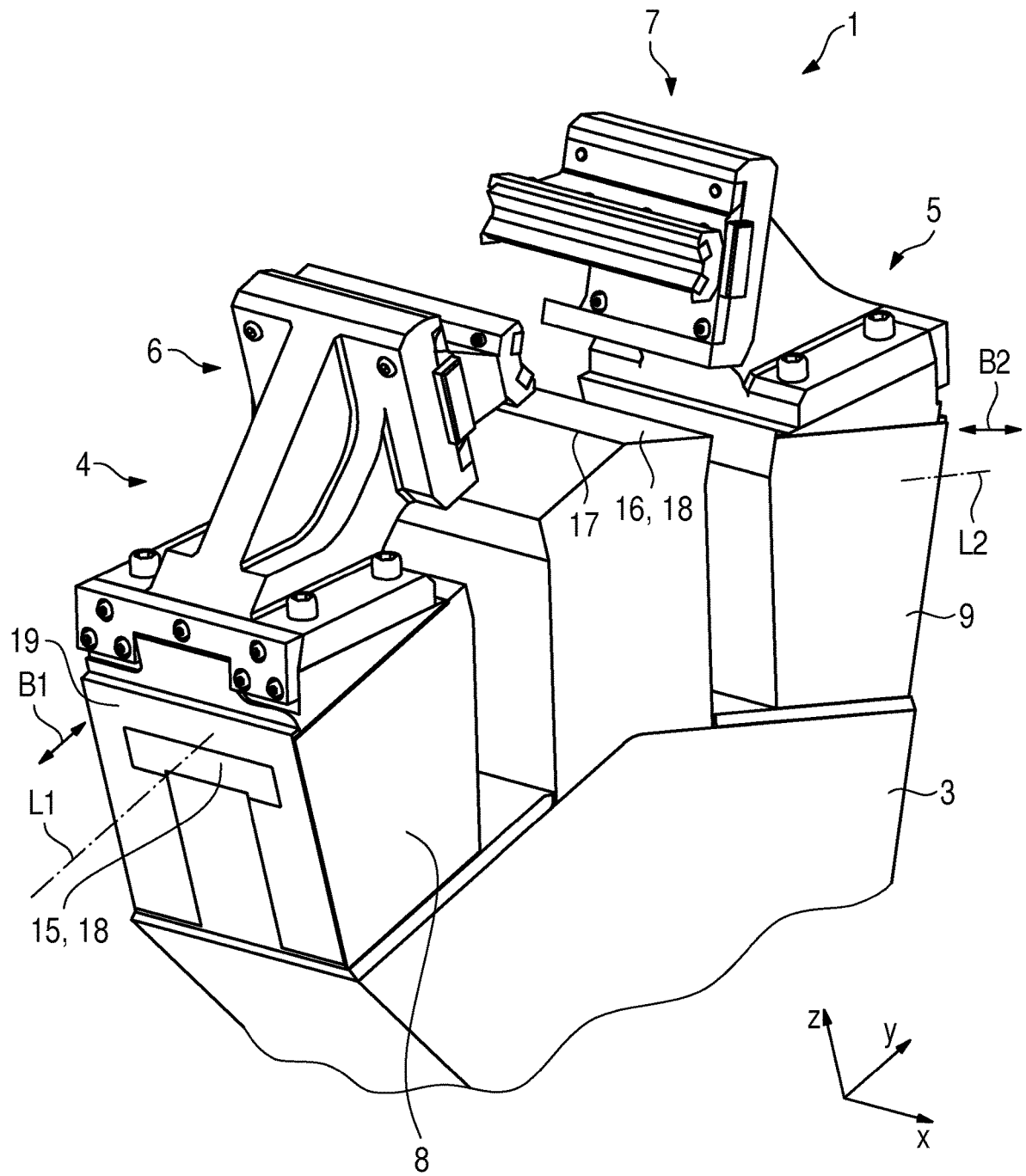
FIGS. 3 and 4 are each schematic views of a steady rest according to an embodiment, in a non-operating position.
Figure 4:
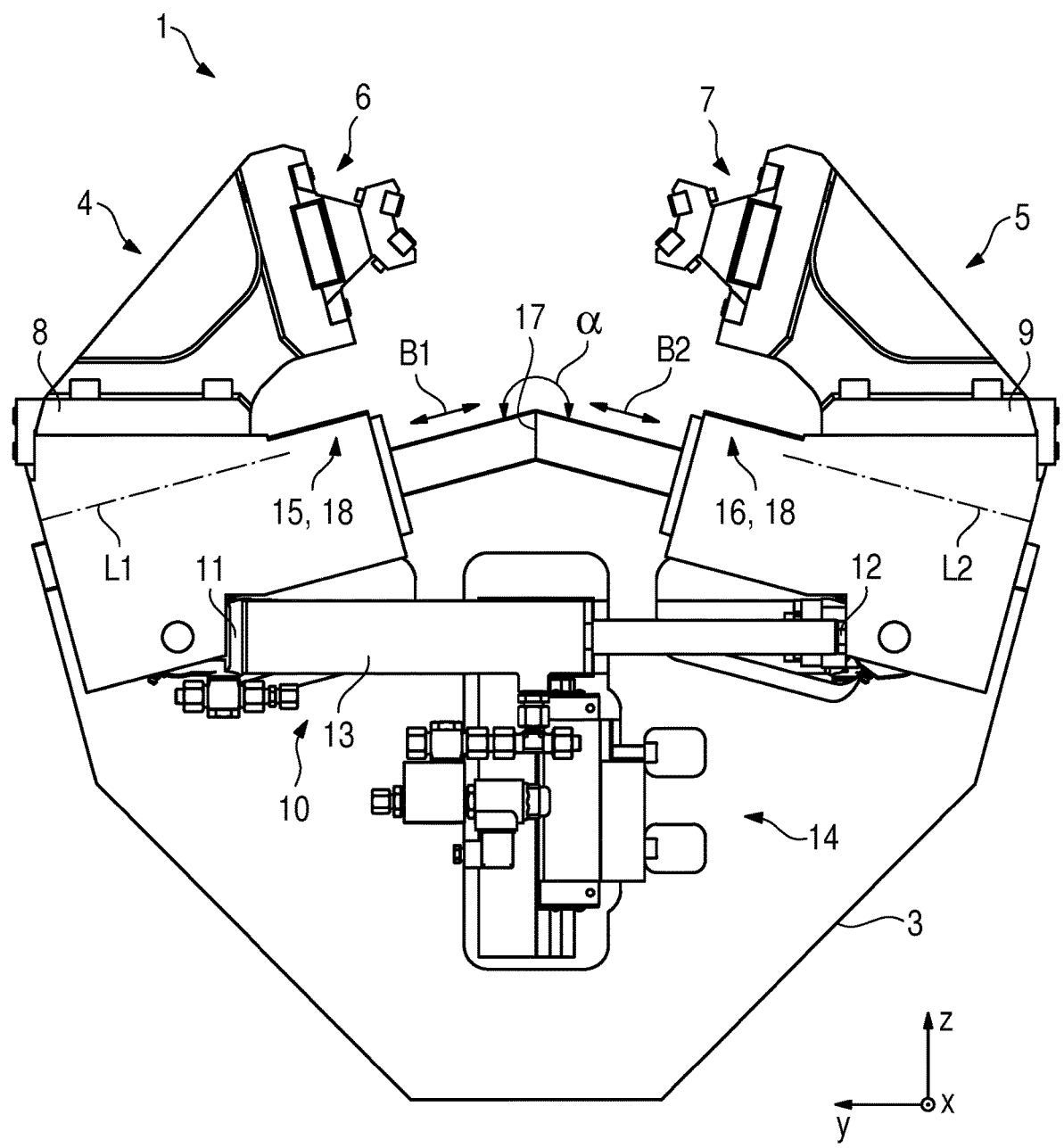

It is clear from a comparison of FIGS. 1 and 2 and FIGS. 3 and 4 that the support means 4, 5 are mounted so as to be movable between at least two defined positions, specifically an operating position, shown in FIGS. 1 and 2, in which support of the workpiece 2 to be supported is possible, using the support means 4, 5, and a non-operating position shown in FIGS. 3 and 4, in which support of the workpiece 2 to be supported is not possible, using the support means 4, 5. The movement paths B1, B2 along which the support means 4, 5 are movably mounted thus extend between the two defined positions. In the operating position, the support means 4, 5 are moved against the workpiece 2 to be supported, in particular jammed or clamped against the workpiece 2 to be supported, i.e. mechanical contact exists between the relevant support element 6, 7 and the workpiece 2 that is to be supported or is being supported (cf. FIGS. 1 and 2). The workpiece 2 is thus supported by the support means 4, 5 in a secure manner, i.e. in particular in a fixed or stationary manner, and can be mechanically machined.

The arrangement or formation of the support means 4, 5 on the steady rest main body 3 in a manner mounted so as to be movable relative to the steady rest main body 3, provides an option for simple, flexible support of workpieces 2 of (significantly) different dimensions, in particular with respect to the cross section, that are to be supported by the steady rest 1.

The support means 4, 5 can in each case be arranged on the steady rest main body 3 so as to be movable, in a manner depending on or independently of one another, relative to the steady rest main body 3, in one movement path B1, B2, respectively. In the case of dependent movable mounting of the support means 4, 5, such as the embodiment shown in the figures, a change in the position of the first support means 4, 5, caused by a movement of the first support means 4, 5, is (necessarily) associated with a movement of a second support means 4, 5, and thus a change in the position of a second support means 4, 5. In this case, the movements of the support means 4, 5 are typically not oriented in the same direction i.e. the support means 4, 5 are moved towards one another or away from one another.

The dependent movable mounting of the support means 4, 5 is achieved by motion-coupling of the support means 4, 5, allowing for synchronous or synchronized movements of the support means 4, 5, e.g. from the relevant operating position into the relevant non-operating position, and vice versa. The support means 4, 5 are thus motion-coupled.

The motion coupling of the support means 4, 5 is achieved by a coupling means 10 connected between the support means 4, 5. The coupling means 10 is coupled to a first support means 4 via a first coupling portion or a first coupling apparatus 11, e.g. in the form of a pin, and coupled to a second support means 5 via a second coupling portion or a second coupling apparatus 12, e.g. in the form of a pin. The coupling means 10 comprises at least one coupling element 13 in the form of a for example hydraulic actuating cylinder. The coupling element 13 is coupled to a first support means 4 via a first coupling element portion or the first coupling apparatus 11, and coupled to the second support means 5 via a second coupling element portion or the second coupling apparatus 12. The coupling means 10 can accordingly be actuating cylinder means.

The coupling means 10 can form a component of a drive means 14 which is designed for generating a drive force that causes the support means 4, 5 to move in a relevant degree of freedom of movement.

The steady rest 1 thus comprises a drive means 14 which is designed for generating a drive force that causes the support means 4, 5 to move in a relevant degree of freedom of movement. In the embodiment shown in the figures, the drive means 14 is coupled indirectly, i.e. by interposition of a force-transmitting assembly, i.e. the coupling means 10, to the support means 4, 5 that are to be moved. Specifically, the drive means 14 acts on the coupling means 10 in order to cause the coupling element 13 to extend or retract, which, owing to the coupling of the coupling element 13 to the support means 4, 5, leads to a movement of the support means 4, 5 relative to the steady rest main body 3.

The drive means 14 can act for example electrically, hydraulically or mechanically. In the embodiment shown in the figures, the drive means 14 is designed as an electrical or hydraulic drive means, i.e. as an electrohydraulic actuator means.

It can be seen that the steady rest main body 3 comprises two ramp-like guide portions 15, 16 that are oriented so as to be at an angle relative to one another and extend in a straight line (having a constant gradient with respect to an e.g. horizontal reference plane). The guide portions 15, 16 are arranged or formed (in a front view of the steady rest) so as to be opposite one another, resulting in a V-like or V-shaped arrangement of the guide portions 15, 16; the guide portions 15, 16 form the limbs of the V which transition into a ridge 17 (cutting edge) formed by the respective ends thereof. The angle α between the exposed surfaces or upper faces of the guide portions 15, 16 is therefore greater than 180°.

The support means 4, 5 are arranged or formed on a guide portion 15, 16 so as to be movable, relative to a relevant guide portion 15, 16, in the relevant degree of freedom of movement. A first support means 4 is mounted so as to be movable relative to a first guide portion 15, i.e. associated with the first guide portion 15, and a second movably mounted support means 5 is mounted so as to be movable relative to a second guide portion 16, i.e. is associated with the second guide portion 16. The support means 4, 5 are positioned directly on respective guide portions 15, 16.

The guide portions 15, 16 are in each case elongate and thus comprise a longitudinal axis L1, L2. A relevant support means 4, 5 associated therewith is accordingly arranged or formed on the relevant guide portion 15, 16 in a manner so as to be movable relative thereto, in a movement path B1, B2 that extends along the longitudinal axis L1, L2 of the relevant guide portion 15, 16, in particular in parallel therewith. The longitudinal axis L1, L2 of each guide portion 15, 16 therefore similarly defines the movement paths B1, B2, a relevant support means 4, 5 being arranged or formed so as to be movable along said movement paths, relative to the guide portion 15, 16.

The guide portions 15, 16 form part of a guide means that is designed for guiding a movement of the support means 4, 5 in the relevant movement path B1, B2. In order to form the guide means, the guide portions 15, 16 cooperate with guide elements 19 that are arranged or formed on the support means side. The guide means thus comprises first guide elements 18 that are arranged or formed on the steady rest main body side or the guide portion side, and second guide elements 19 which cooperate therewith and are arranged or formed on the support means side.

The first guide elements 18 arranged or formed on the steady rest main body side are for example a guide surface or geometry, which, in the embodiment shown in the figures, is T-shaped in cross section, and a second guide element 19 arranged or formed on the support means side is a mating guide surface or geometry that surrounds a corresponding guide surface or geometry. Of course, an inverted configuration of the first and second guide elements 18, 19, respectively, is conceivable.

The guide means equally ensures a captive arrangement of the support means 4, 5 on the steady rest main body 3. As a result, in addition to the guide function the guide means also exert a securing function of the respective support means 4, 5 on the steady rest main body 3.

It is clear that, in the operating position of the support means 4, 5 shown in FIGS. 1 and 2, a possibility is provided for a machining tool of a device for mechanical machining of a workpiece 2 to be mechanically machined to pass through, such that a machining tool, i.e. for example a milling tool, can pass the steady rest 3, in particular along the longitudinal axis of the workpiece 2 that is supported by the steady rest 1 and is to be mechanically machined, by means of the possibility for passage, in the direction of the longitudinal axis of the workpiece 2. The steady rest 1 is therefore designed in such a way that it does not prevent continuous mechanical machining of the supported workpiece 2, since it is possible for a machining tool to pass through, beyond the steady rest 1, without interruption of a mechanical machining process.

Figure 5:
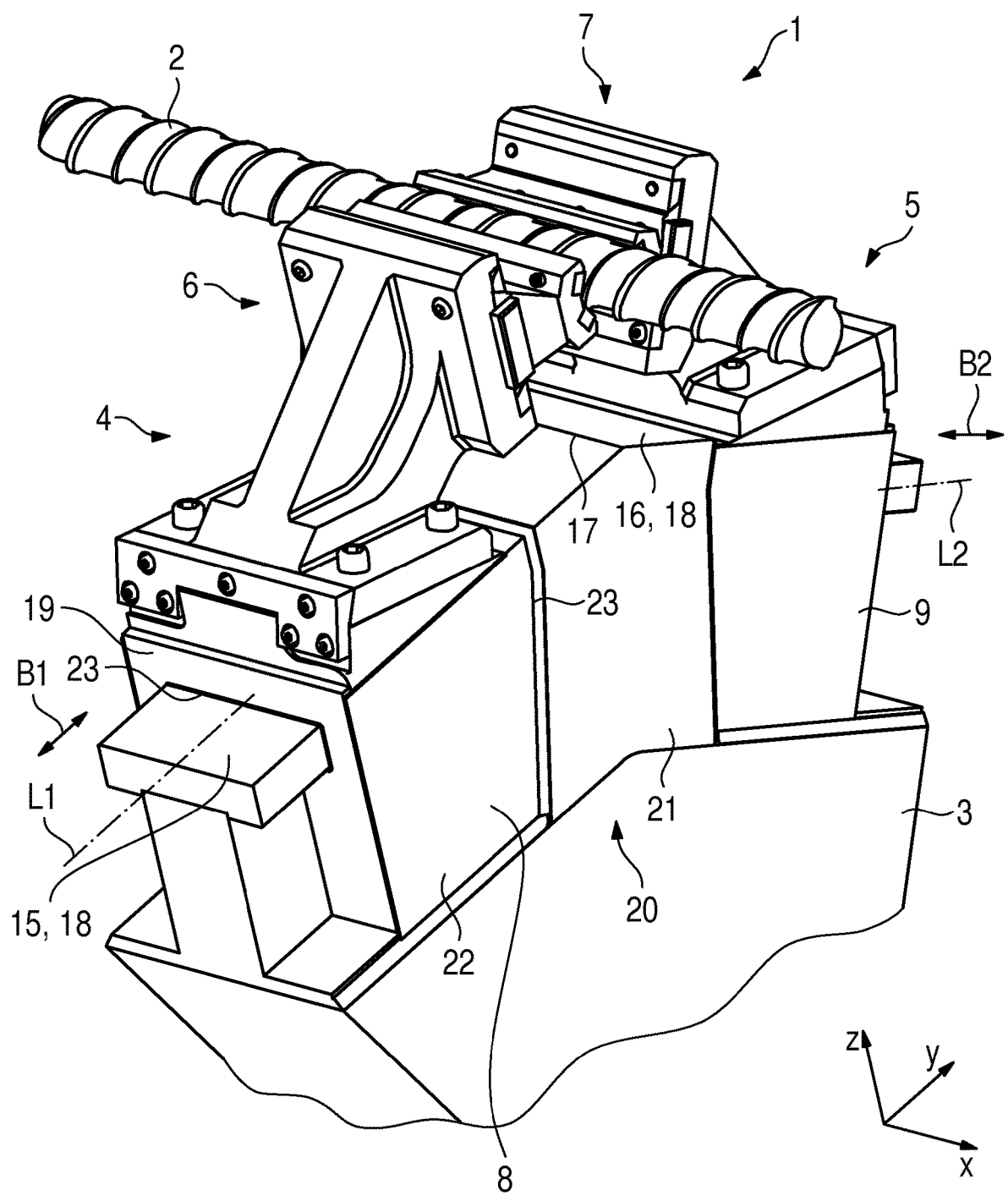
FIGS. 5 and 6 are each schematic views of a steady rest according to a further embodiment, in an operating position.
Figure 6:
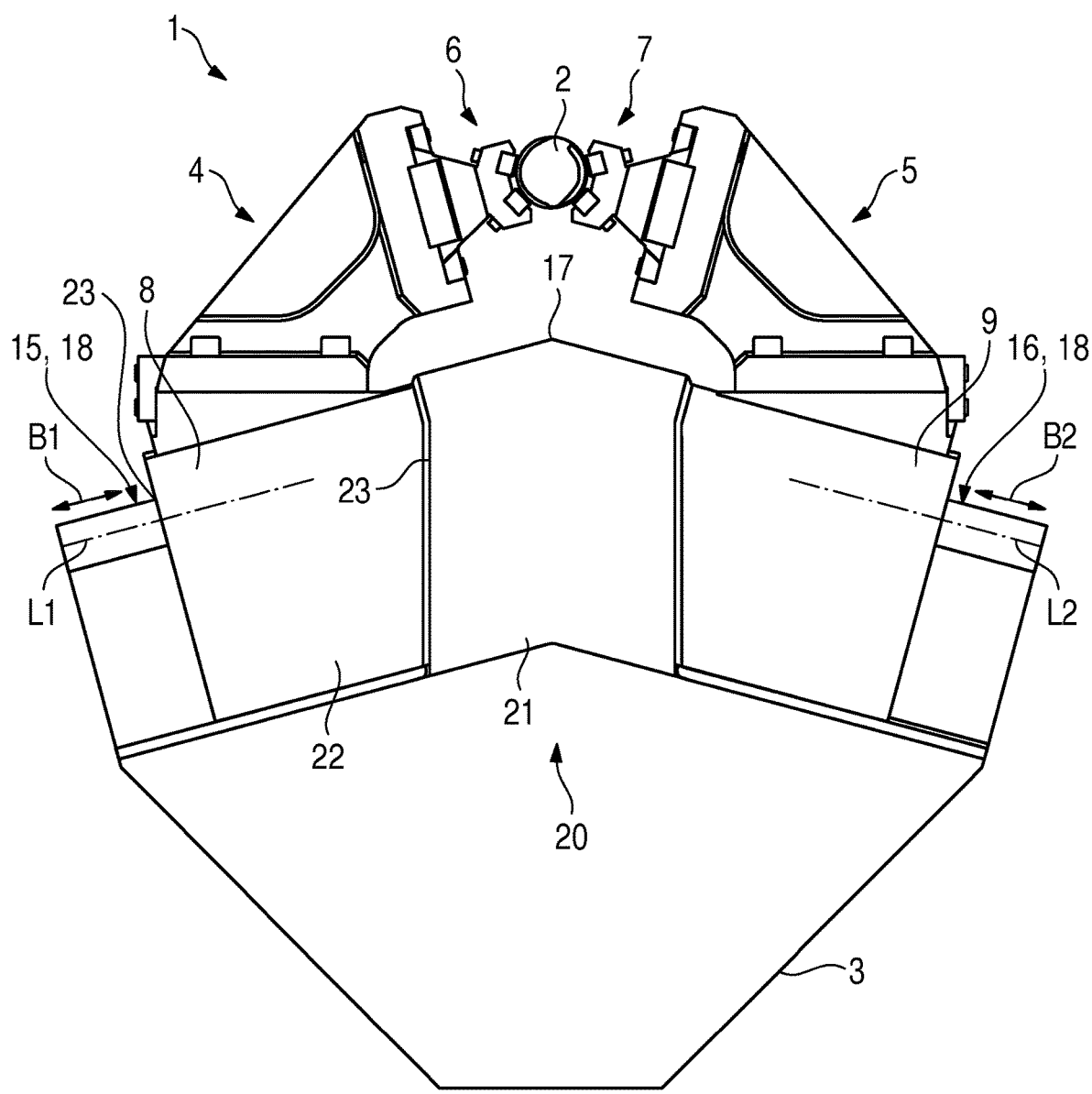

FIGS. 5 and 6 are each schematic views of a steady rest 1 according to a further embodiment, in an operating position, FIG. 5 being a perspective view of the steady rest 1 and FIG. 6 being a front view of the steady rest 1.

In contrast with the embodiment shown in FIGS. 1-4, in this case the steady rest 1 comprises at least one chip protection means 20 which is designed to prevent deposition of cut material, i.e. in particular chippings, resulting during the processing, in particular machining, of the workpiece 2 from being deposited on functionally relevant portions of the steady rest 1. The chip protection means 20 comprises a plurality of in particular plate-like or plate-shaped chip protection elements 21, 22. First chip protection elements 21 can for example be arranged or formed in the region of the guide portions 15, 16 in order to prevent deposition of cut material here, and second chip protection elements 22 can for example be arranged or formed in the region of the support means 4, 5, in order to prevent deposition of cut material here.

FIG. 5 furthermore shows scraper means 23, e.g. in the form of bristles or brushes, which are arranged on the support means side and which allow for scraping or removal, from the guide portions 15, 16, of cut material that may have been deposited on the guide portions 15, 16, in particular by means of a corresponding movement of the support means 4, 5. In the embodiment, the scraper means 23 are arranged or formed by way of example in the region of second guide elements 19 that are arranged or formed on the support means side in each case.

Even if not visible in the figures, in order to allow for temporary blocking of a (further) movement of the support means 4, 5, the steady rest 1 may comprise a blocking means (not shown) which is designed for blocking a movement of at least one support means 4, 5, in particular for blocking a support means 4, 5, moved into an operating or non-operating position, in the operating or non-operating position. The blocking means can act for example magnetically and/or mechanically, and therefore the blocking means can comprise at least one for example magnetically and/or mechanically acting blocking element, i.e. for example a locking magnet or a locking pin.

Of course, individual, a plurality of, or all the features of the embodiment of the steady rest 1 shown in the figures can be combined with one another as desired.

The invention claimed is:

1. A steady rest for supporting a workpiece that is to be mechanically machined, comprising:
   a steady rest main body configured to be arranged in a device for mechanical machining of the workpiece, and
   two supports, wherein each of the two supports is arranged or formed on the steady rest main body and is intended for supporting the workpiece, wherein each of the two supports comprises at least one workpiece supporter configured to support the workpiece, wherein each of the two supports is arranged or formed on the steady rest main body so as to be movable, relative to the steady rest main body, in at least one degree of freedom of movement along a movement path of each respective support, wherein the two supports are motion-coupled via an actuating device arranged between and coupling the two supports to each other, wherein a first end of the actuating device is coupled to a first support of the two supports via a first coupling portion or a first coupling apparatus and a second end of the actuating device is coupled to a second support of the two supports via a second coupling portion or a second coupling apparatus, wherein the steady rest main body comprises two ramp-like guide portions that are arranged so as to be at an angle relative to one another, each of the two supports being arranged or formed on a respective ramp-like guide portion of the steady rest main body so as to be movable, in the at least one degree of freedom of movement, relative to the respective ramp-like guide portion of the steady rest main body, wherein opposing ends of the ramp-like guide portions extend towards each other and respective end faces of each of the opposing ends of the two ramp-like guide portions are opposite to and facing one another and; and wherein the ramp-like guide portions transition, in a region of respective opposing ends thereof, into a ridge formed by the respective opposing ends thereof.

2. The steady rest according to claim 1, wherein each ramp-like guide portion is elongate, the support being arranged or formed on the ramp-like guide portion in a manner so as to be movable relative to the ramp-like guide portion, in the movement path that extends along the longitudinal axis of the ramp-like guide portion.

3. The steady rest according to claim 1, wherein at least one of the two supports further comprises a guider which is configured to cooperate with the ramp-like guide portion on the steady rest main body side, the guider forming a guide which is configured for guiding movement of the at least one of the two supports in the at least one movement path defined by the at least one degree of freedom of movement.

4. The steady rest according to claim 1, wherein each of the two supports is mounted so as to be movable between an operating position in which the workpiece is supported, and a non-operating position in which the workpiece is not supported.

5. The steady rest according to claim 4, wherein, in the operating position of each of the two supports, the steady rest is configured such that a machining tool is able to pass the steady rest along direction of the longitudinal axis of the workpiece to mechanically machine the workpiece.

6. The steady rest according to claim 1, wherein the at least one degree of freedom of movement is a translational degree of freedom of movement, and the movement path defined by the at least one degree of freedom of movement is a translational movement path.

7. The steady rest according to claim 1, wherein the actuating device comprises at least one drive which is configured for generating a drive force that causes the two supports to move in the at least one degree of freedom of movement of each respective support.

8. The steady rest according to claim 1, further comprising at least one chip protector which is configured to prevent deposition of cut material resulting during the processing of the workpiece from being deposited on the steady rest.

9. The steady rest according to claim 1, wherein at least one of the two supports further comprises at least one scraper which is configured to allow for scraping or removal, from at least one of the ramp-like guide portions, of cut material deposited on the ramp-like guide portions, by a corresponding movement of the at least one support of the two supports.

10. The steady rest according to claim 1, further comprising a locking magnet or a locking pin which is configured for blocking the two supports in a respective operating position or in a respective non-operating position.

11. A device for mechanical processing of the workpiece that is to be mechanically machined, said device comprising at least one steady rest according to claim 1.

* * * * *